US012681300B2

(12) United States Patent
Hoffmann

(10) Patent No.: US 12,681,300 B2
(45) Date of Patent: Jul. 14, 2026

(54) HEAD-UP DISPLAY WITH A CONTACTLESSLY CONTACTED CONVEYOR BELT-LIKE DISPLAY AREA, IN PARTICULAR FOR A VEHICLE

(71) Applicant: Bayerische Motoren Werke Aktiengesellschaft, Munich (DE)

(72) Inventor: Philipp Hoffmann, Hannover (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 215 days.

(21) Appl. No.: 18/775,546

(22) Filed: Jul. 17, 2024

(65) Prior Publication Data

US 2025/0028171 A1    Jan. 23, 2025

(30) Foreign Application Priority Data

Jul. 18, 2023    (DE) ..................... 10 2023 118 917.4

(51) Int. Cl.
*G02B 27/01*        (2006.01)
*B60K 35/231*       (2024.01)
(Continued)

(52) U.S. Cl.
CPC ........ *G02B 27/0101* (2013.01); *B60K 35/231* (2024.01); *B60K 35/81* (2024.01);
(Continued)

(58) Field of Classification Search
CPC ............ G02B 27/0101; G02B 27/0149; G03B 21/2033; G03B 21/2046; B60K 35/00;
(Continued)

(56) References Cited

U.S. PATENT DOCUMENTS 9,190,028 B2    11/2015  Gilbert et al.
2004/0212572 A1  10/2004  Lam et al.
2020/0201043 A1*  6/2020  Sugiyama ................. G09F 9/00

FOREIGN PATENT DOCUMENTS

EP          4 030 412 A1    7/2022
WO        WO 99/35634 A1    7/1999
WO      WO 2019/023489 A1    1/2019

OTHER PUBLICATIONS

German-language Search Report issued in German Application No. 10 2023 118 917.4 dated Jun. 28, 2024 with partial English translation (10 pages).

* cited by examiner

*Primary Examiner* — James A Dudek
(74) *Attorney, Agent, or Firm* — Crowell & Moring LLP

(57)    ABSTRACT

A projection unit for a field-of-view display device designed to superimpose, via reflection, a virtual image on a reflection pane, in particular a vehicle pane, arranged in the field of view of a user, includes at least one rectangular imaging display area arranged in or below a top side of an instrument panel of a vehicle and formed by a mechanically movable belt with at least one light source bar fastened thereon which extends across its direction of belt movement and carries strung-together light sources in its direction of extent. The light sources are contactlessly controllable synchronously with the belt movement and independently of one another for creating a desired display content in the display area. At least one receiver circuit board is fastened to the belt and electrically connected to the light sources. At least one associated transmitter circuit board is arranged stationarily in the projection unit in a manner mechanically decoupled from the belt and designed for contactless power and video signal transfer to the light sources via the at least one receiver circuit board.

10 Claims, 3 Drawing Sheets

(51) Int. Cl.
  B60K 35/81          (2024.01)
  G03B 21/20          (2006.01)
(52) U.S. Cl.
  CPC ..... G02B 27/0149 (2013.01); G03B 21/2033
         (2013.01); G03B 21/2046 (2013.01); *B60K*
       *2360/42* (2024.01); *B60K 2360/47* (2024.01);
         *B60K 2360/589* (2024.01); *G02B 2027/0123*
       (2013.01); *G02B 2027/0154* (2013.01); *G02B*
                          *2027/0194* (2013.01)
(58) Field of Classification Search
  CPC ...... B60K 35/23; B60K 35/60; B60K 35/213;
                          G09F 11/12
  See application file for complete search history.

HEAD-UP DISPLAY WITH A CONTACTLESSLY CONTACTED CONVEYOR BELT-LIKE DISPLAY AREA, IN PARTICULAR FOR A VEHICLE

CROSS REFERENCE TO RELATED APPLICATION

This application claims priority under 35 U.S.C. § 119 from German Patent Application No. 10 2023 118917.4, filed Jul. 18, 2023, the entire disclosure of which is herein expressly incorporated by reference.

BACKGROUND AND SUMMARY

The invention relates to a projection unit for a field-of-view display device, which is also known as a head-up display (HUD) and which can be used, in particular, in a motor vehicle or any other land craft, aircraft or watercraft. Field-of-view display devices of this type are designed to create a virtual image that is superimposed into the field of view of a user by way of reflection at a vehicle pane, in particular a windshield or a combiner pane, which is specifically provided to this end and arranged in the field of view of the user. The invention is also directed to such a field-of-view display device and to a vehicle equipped therewith.

The use of a head-up display for superimposing display content such as information about speed restrictions or other useful navigation and vehicle operation notifications in the form of a virtual image into the physical surroundings in front of the vehicle observed by the driver who thus needs not look away from the road in order to read this display is known, especially for motor vehicles. To create the display content, a HUD of conventional structure comprises a projection unit housed below the windshield in the interior of the instrument panel. It typically contains a display for creating a light beam with desired display content and an imaging and projection optical unit, usually with a concave mirror, for shaping the light beam and steering the latter to the windshield such that it is reflected by the windshield to the eyes of the driver, who is thus able to see the virtual image in a suitable size and at a suitable distance beyond the reflection pane. However, the dimensions of the concave mirror scale linearly with the size of the virtual display region, significantly restricting the latter.

Thus, a known alternative for applications requiring a significantly larger virtual display region is that of an HUD structure with a large-area display extending directly opposite the windshield in a top side of the instrument panel. This can be considered especially for future vehicles which are driven in fully automated or autonomous fashion and which should manage without a vehicle-guiding user input, with the result that the associated entertainment systems in the passenger compartment are becoming ever more important. For example, the intention in the case of an HUD of this type might be that of superimposing additional information on the windshield over its entire width to a driver and/or a front passenger of the vehicle, depending on the situation and on the outer surroundings, and also of displaying a continuous panorama-like virtual image when necessary. To this end, the image-creating display would have to extend over the entire width of the windshield.

An LED display would be better suited than a liquid crystal electronic visual display with regards to meeting high intensity demands on the display light in the case of reflection in the transparent region of the windshield during daylight because high intensity losses in the liquid crystal layer are unavoidable. However, an excessive number of LEDs (several million) would be required for such a large displaying area, which in turn would have a significant influence on the energy balance and the greenhouse gas emissions of the vehicle connected therewith. Thus, a possible display size for a panorama-like display would be 1200 mm (length) by 300 mm (width) for a 4:1 ratio. Approx. 2 000 000 LEDs would have to be installed to this end if a conventional electronic visual display is used. These are strung together in approx. 1920 columns over the width of the HUD display. This large number of LEDs would create a greenhouse gas emission of more than 1.2 $CO_2$ equivalents.

For example, the prior art has disclosed, for design products and toys or greeting cards, rotating display devices with a circular display area creatable by rotation, for example as described in U.S. Pat. No. 9,190,028 B2 or EP 4 030 412 A1. Such a rotating display device comprises a fixed motor, at the motor shaft of which a rotating unit is fastened such that the rotating unit is rotated by the motor. The rotating unit is designed as at least one rod-shaped arm arranged in the radial direction, with an LED strip being fastened to the arm in the longitudinal direction. Suitable rotary or position sensors are provided for the synchronization of the LED control with the rotation of the arm. This display device may comprise for example a single radial arm, two individual radial arms spaced apart by 180° or four individual radial arms spaced apart by 90°, depending on the embodiment. Similarly, WO 2019/023489 A1 discloses a device and a method for displaying an image, which is created by the emission or reflection of light by rotating elements such as the fan blades of a fan.

Further, WO 99/35634 discloses a rotating display arrangement having a round, elongate oval or polygonal cross section and a plurality of display elements distributed uniformly on a moving belt that forms a lateral face of the arrangement. To be able to realize a plurality of different emission directions, separating walls with different inclinations can be provided between the individual display elements in this case. US 2004/0212572 A1 discloses a similar display arrangement, wherein a belt is wound about one or more parallel shafts which are arranged at the corners of a corresponding polygonal cross section. The power and signal transfer required for display creation to one or more LED bars fastened to the belt and thus moved in conveyor belt-like fashion during operation is implemented by means of a communications unit having protruding metallic or other solid-body contacts that engage in associated contact rings on the surface of one of the shafts and thereby establish electrical contact to the latter. Metal strips ensuring electrical contact to the contact rings of the shaft are provided at appropriate positions on the moving belt. However, such sliding contacts may wear quickly on account of the fast and frequent rotation of the belt. For example, this would require regular replacement of the sliding contacts, meaning ongoing costs for the corresponding service.

The problem addressed by the present invention is that of providing an alternative and/or, in view of energy balance, robustness and/or economy, improved structural concept for a field-of-view display device, which also allows the creation of a large-area virtual image, for example for a panorama-like display. In particular, the intention is for this field-of-view display device to be suitable for integration in a vehicle and for virtual display via reflection on the windshield of the latter.

This problem is solved by a projection unit, by a field-of-view display device containing the projection unit, and by a vehicle equipped therewith, according to the independent claim(s). Further configurations are specified in the dependent claims. All features and effects relating to the development of the projection unit specified in the claims and the description below also apply in relation to the field-of-view display device and the vehicle, and also vice versa in each case.

A first aspect provides for a projection unit for a field-of-view display device which can be designed for use in a vehicle in particular. The field-of-view display device is designed to superimpose into the field of view of a user, via reflection, a virtual image on a reflection pane, in particular a vehicle pane, arranged in the field of view of the user. For example, it may be designed as a head-up display (HUD).

The projection unit is designed to create a projection light beam with a desired display content during the operation of the field-of-view display device and to cast the projection light beam onto the aforementioned reflection pane, whereby the desired virtual image appears to the user as floating beyond the reflection pane. In particular, the user can be a driver and/or front passenger, but also any other vehicle occupant.

To this end, the projection unit comprises at least one rectangular imaging display area which may be designed in particular for arrangement in or below a top side of the instrument panel or parcel shelf of the vehicle. To save material and energy resources, the display area is designed according to a conveyor belt concept. To this end, it comprises a mechanically movable belt (also referred to as "conveyor belt" herein) with at least one light source bar which is fastened thereon, which extends across the direction of belt movement and which carries light sources, for example LEDs, strung together in its direction of extent. The respective light source bar might have for example the height (or width) of the desired display region and, by means of the belt movement, be moved quickly back and forth over the entire width (or height) of the desired display region, or else be "rotated" in an unchanging direction of movement.

The light sources are contactlessly controllable synchronously with the belt movement and independently of one another for the purpose of creating a desired display content in the display area. To this end, provision is made for at least one receiver circuit board which is fastened to the belt and electrically connected to the light sources, and at least one associated transmitter circuit board. The transmitter circuit board is arranged stationarily in the projection unit in a manner mechanically decoupled from the belt and designed for contactless power and video signal transfer to the light sources via the at least one receiver circuit board.

An idea of the projection unit firstly consists in replacing, in a field-of-view display device, for example an HUD, which may be designed for use in a vehicle, a large-area image-creating displaying area with a high luminous intensity, as for example required for panorama-like virtual display or for AR (augmented reality) applications in the windshield of the vehicle, with a conveyor belt-like display area, known as such from other applications. This can reduce the number of LEDs required in the HUD displaying area to such a significant extent that despite the additional rotary drive consumption for the conveyor belt, a significant improvement in the energy balance and hence also a reduction in the greenhouse gas emission of the vehicle and—if the vehicle comprises a battery electric drive—a correspondingly larger range are obtainable. Moreover, this displaying area is easily scalable by the addition of further rectangular display areas of this type and can thus be flexibly adjusted to geometric requirements of various applications. A further concept in this case consists in a completely contactless power and signal supply for the light sources arranged on the conveyor belt. As a result, it is possible to manage without the use of sliding contacts, with the result that the conveyor belt has a lower rolling friction overall, and hence a longer running time is possible in comparison with the display devices mentioned at the outset. As a result, greater robustness and reliability of the device are also obtainable, which is particularly important for use in a vehicle.

According to an embodiment, the projection unit comprises two parallel belt shafts for each rectangular display area, the belt shafts extending at two opposing peripheral sides of the display area, and a rotary drive designed to rotate at least one of the two belt shafts. In this case, the belt forms a loop spanned between the two belt shafts and wound around the latter, wherein the at least one belt shaft rotatable by the rotary drive is designed to carry along the belt for creation of the aforementioned belt movement. For example, this can be a belt conveyor. For example, the light source bars may extend parallel to the shafts.

In particular, the at least one receiver circuit board can be fastened to the belt on the outer side in this embodiment. In one alternative, it may also be integrated in the belt, for example, among many other options. In this case, the at least one transmitter circuit board is arranged in an empty intermediate space delimited by the loop, in such a way that it has no mechanical contact with the belt or with the belt shafts. Firstly, a transmitter arrangement that saves as much space as possible can be achieved as a result. Moreover, this allows the distance to the light source bars or receiver circuit boards to be minimized and, in particular, also allows data and power to be supplied to both sides of the loop, for example in order thereby to additionally increase the frame or data rate. In an alternative to that or in addition, it is however also possible for one or more transmitter circuit boards to be arranged elsewhere in the projection unit, for example outside of the belt loop on its side facing away from the user among many other options.

For example, the contactless current transfer is implemented inductively and the video signal transfer is implemented contactlessly by NFC (near field communication), wherein other data transfer standards may also be used as a matter of principle. Accordingly, at least a portion of the aforementioned transmitter and receiver circuit boards may be designed for inductive power supply of the light sources (in other words, for contactless energy transfer by electromagnetic induction) and at least a portion of the transmitter and receiver circuit boards can be designed for contactless video signal transfer by NFC. To this end, required electric and electronic components such as capacitors, receiver coils, antennas, etc. are arranged on the aforementioned circuit boards.

The transmitter and/or receiver circuit boards can be distributed, in particular uniformly, along the belt and/or be connected to one another. In this context, the receiver circuit boards may be integrated in the bars themselves, for example. In an alternative to that or in addition, the receiver circuit boards may however also be arranged on the belt next to the at least one light source bar or between the light source bars. In this case, a correspondingly higher data rate of the video signal transfer, for example, may be obtainable with a greater number of transmitter and/or receiver circuit boards.

According to an embodiment, the belt comprises a plurality of lamellas arranged on the outer side and for example distributed uniformly along the direction of belt movement.

The lamellas extend parallel to one another and to the light source bars and are designed to impress a predetermined emission direction on the projection light created by the light source bars and/or to shield the display area in other directions. To this end, the lamellas can be spatially oriented, i.e. aligned, substantially parallel to one another, in particular over the entire display area. For example, they can be designed or coated in light-absorbing fashion in order to block light rays from other directions than the aforementioned emission direction.

Further, the projection unit may comprise a cover pane which extends along the imaging display area in the beam path of the projection light emanating therefrom and which is designed to transmit the projection light substantially without losses and, in the process, at least partly close off and protect the projection unit from the outside. The cover pane may serve, inter alia, to prevent a vehicle occupant from interfering with the elements of the display area moving in conveyor belt-like fashion, and may optionally be equipped with further mechanical and/or optical functions. To this end, it can be produced from any suitable material, for example glass or transparent plastic such as acrylic glass, etc.

A further aspect provides for the aforementioned field-of-view display device, which in addition to a projection unit as presented herein also comprises an aforementioned reflection pane, which for example can be formed by a vehicle pane or designed as a specially provided combiner pane. The reflection pane is arranged in the beam path of the projection light output by the projection unit. It is reflective on the user side and can be in particular at least partly transparent to the ambient light incident on the back side so that the virtual image is superimposed on the physical surroundings observed by the user through the reflection pane. In this case, the reflection pane is arranged in the field of view of the user and designed such that it reflects the projection light to an eye box which has been predetermined for user eyes, and so the display content is thereby displayable to the user in the form of a virtual image beyond the reflection pane.

In the case of the above-described embodiment, the lamellas can ideally extend approximately parallel to the reflection pane and for example parallel to the windshield thereof in the case of installation in a vehicle, in order to prevent the users or occupants from viewing the light source bars and output the projection light to the reflection pane only in the required direction.

A further aspect provides for the aforementioned vehicle, which for example can be a motor vehicle or any other land craft, aircraft or watercraft. It has a passenger compartment and a vehicle pane at least partly delimiting the passenger compartment to the outside. For example, the vehicle pane can be a windshield with an instrument panel arranged therebelow or a rear windshield with a parcel shelf arranged therebelow, which delimit the passenger compartment to the front and back, respectively, in the longitudinal direction of the vehicle. If nothing else is specified, all spatial orientation terms used herein, such as "horizontal", "vertical", "above", "below", "underneath", "front", "back", "left", "right", etc. relate to the usual Cartesian coordinate system, stationary with respect to the vehicle, with mutually perpendicular longitudinal, transverse and height directions of the vehicle. Further, the vehicle comprises the aforementioned field-of-view display device, the projection unit of which is arranged in the passenger compartment, in particular in or below a top side of the instrument panel or parcel shelf, and the reflection pane of which is designed as part of the vehicle pane or as a combiner pane specially arranged in the passenger compartment.

In particular, the windshield can be delimited to the left and right by a respective A-pillar of the vehicle in the transverse vehicle direction, and the projection unit and its imaging display area can be arranged in or below the top side of the instrument panel in such a way that the windshield serves at least with the majority of its extent in the transverse vehicle direction as a reflection pane of the field-of-view display device. As a result, a panorama-like virtual display for the driver and/or front seat passenger, in particular, is realizable. To this end, a plurality of rectangular display areas of the type presented here can be arranged next to one another in particular in order to yield a larger overall area.

Other objects, advantages and novel features of the present invention will become apparent from the following detailed description of one or more preferred embodiments when considered in conjunction with the accompanying drawings.

DETAILED DESCRIPTION OF THE DRAWINGS

All different embodiments, variants and specific configuration features of the projection unit, the field-of-view display device and the vehicle according to the aforementioned aspects of the invention, as mentioned above in the description and below in the claims, may be implemented in the examples shown in FIGS. 1 to 3, in particular also as an alternative or in addition to the features shown therein. Therefore, they are not all repeated again below. The same applies accordingly to the feature definitions and effects, already given above, in relation to individual features shown in FIGS. 1 to 3.

Figure 1:
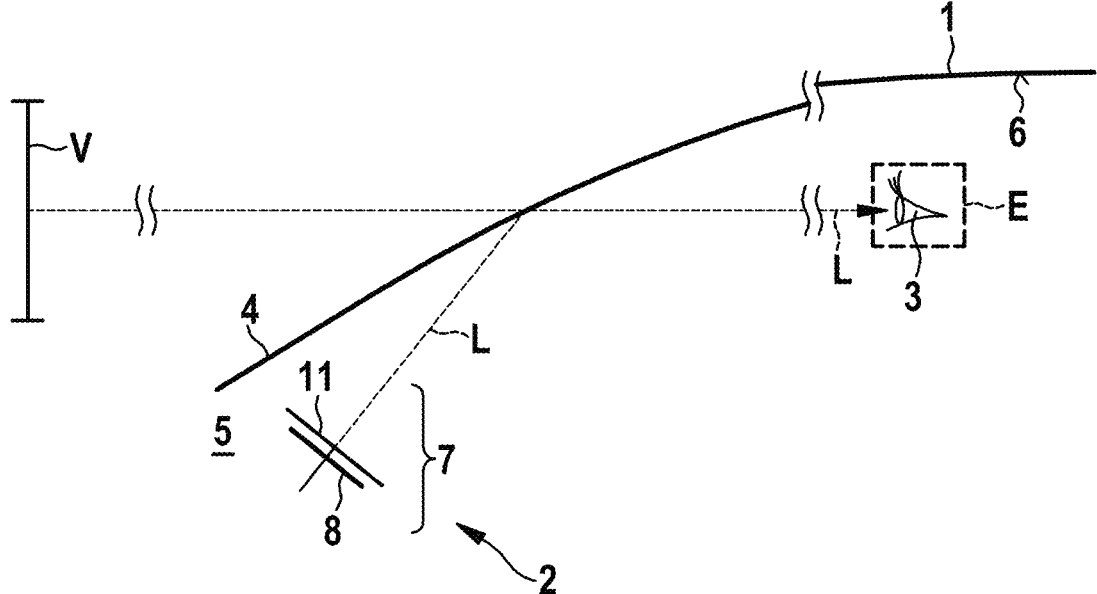
FIG. 1 shows a detail of a vehicle having a field-of-view display device according to an exemplary embodiment of the invention in a vertical longitudinal section.

FIG. 1 shows, in a much simplified schematic illustration and a vertical longitudinal section, a detail of a vehicle 1 having a field-of-view display device 2 according to an exemplary embodiment of the invention. Purely by way of example, the field-of-view The field-of-view display device 2 is designed to create a virtual image V in the field of view of a user, for example a driver of the vehicle 1, who in the vertical longitudinal sectional view of FIG. 1 is only indicated by their eyes 3 and an eye box E, provided for them, in the passenger compartment of the vehicle 1. (As conventional, the eye box is understood herein to be a spatial region provided for the eyes of a user of the field-of-view display device 2, from where they can see the virtual image V with the intended display quality.) Purely by way of example, the vehicle 1 is a motor vehicle. It is indicated in FIG. 1 purely by a windshield 4, an instrument panel 5 which extends therebelow and is not depicted in any more detail, and a roof liner 6 extending thereabove.

The field-of-view display device 2 comprises a projection unit 7 which is arranged below the windshield 4 in the instrument panel 5 in this example. The projection unit 7 is designed to create and output a projection light beam L (also referred to herein as "projection light" for short) with in each case desired display content in the direction of the windshield 4 and arranged in such a way that the projection light L is reflected from the windshield 4 to the user eye box E, and the user sees the virtual image V when gazing into the windshield 4 as a result.

Figures 2A, 2B:
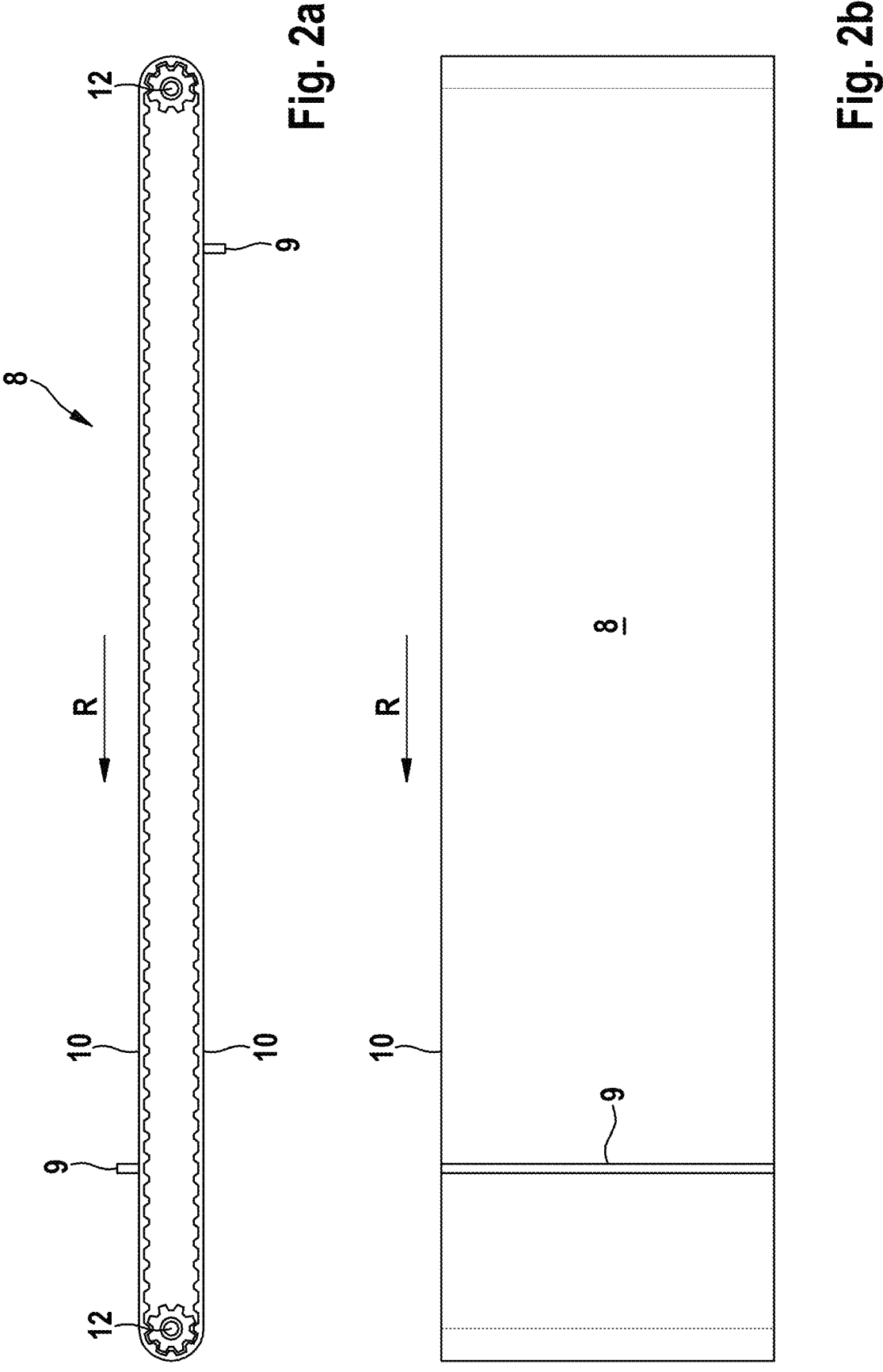
FIG. 2A is a cross-sectional view of an imaging display area of the field-of-view display device of FIG. 1.
FIG. 2B is a plan view of the imaging display area of FIG. 2A.
Figure 3:
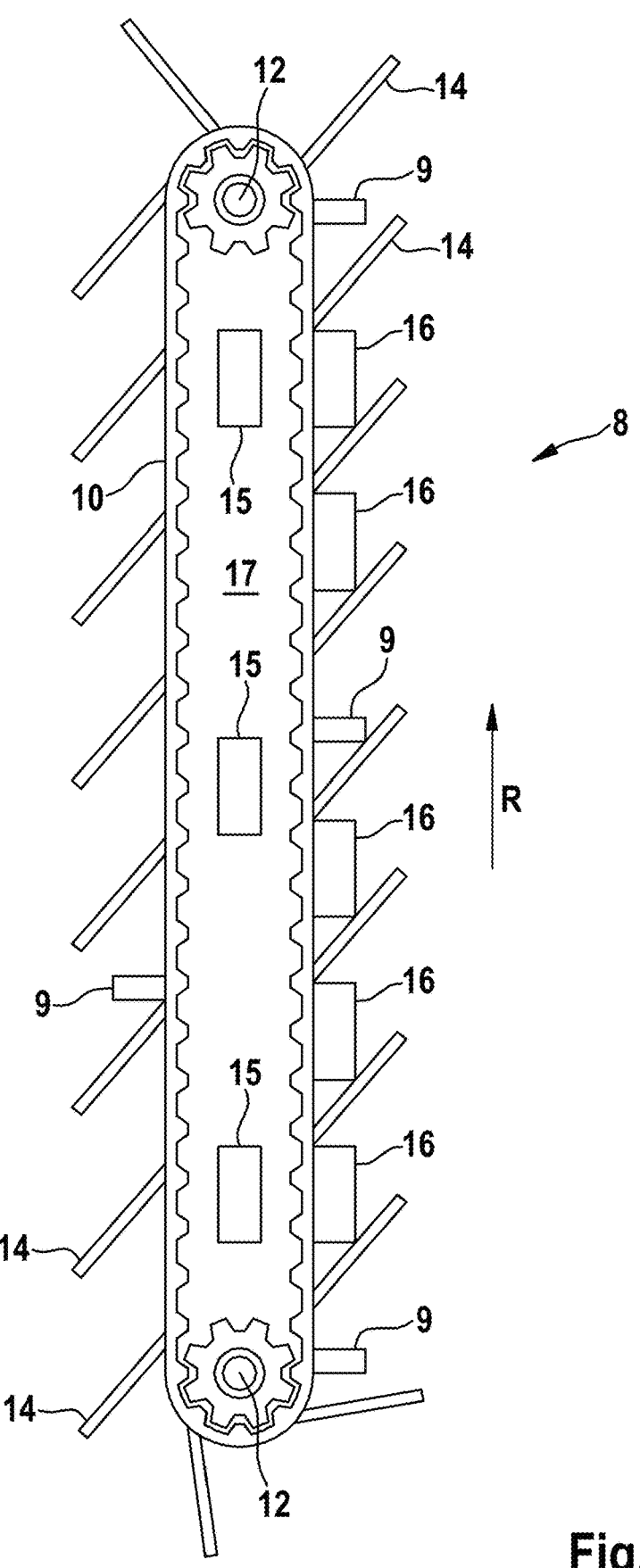
FIG. 3 is a cross-sectional view of a further example of the imaging display area of the field-of-view display device of FIG. 1, which additionally also shows at least a portion of the transmitter and receiver circuit boards provided for contactless power and video signal transfer.

To this end, the projection unit 7 comprises a rectangular imaging display area 8 which, in terms of its surface, is arranged in or virtually directly under a top side of the instrument panel 5 and which is depicted in more detail in FIGS. 2A-2B and FIG. 3. The projection lens L is indicated purely by its central ray in FIG. 1, which leads from a center of the imaging display area 8 to a center of the eye box E. The projection unit 7 can optionally comprise a cover pane 11, which at least partly covers and protects the display area 8 from the direction of the windshield 4 and in the process allows largely loss free passage of the projection light L emanating therefrom.

FIGS. 2A-2B show a basic setup of the imaging display area 8 of the projection unit 7 of FIG. 1 in a cross-sectional view (FIG. 2A) and in a plan view (FIG. 2B). In this example, the rectangular imaging display area 8 is, purely by way of example, created by a total of two light source bars 9 which are arranged equidistantly on a moving belt 10 (conveyor belt). The conveyor belt 10, for example a belt conveyor, is used to quickly move the light source bars 9, which have a height of the desired display region measured in the vehicle longitudinal direction in this example, back and forth and/or continuously rotate these in the same direction of belt movement R over the entire width of the desired display region, which is measured over the entire transverse vehicle direction. Each light source bar 9 carries light sources (not depicted separately) strung together in its longitudinal direction, LEDs in this example, which are controllable independently of one another and synchronously with the belt movement for the purpose of image creation in the imaging display area 8.

To create this conveyor belt movement, the projection unit 7 comprises two parallel belt shafts 12, which extend at two opposing peripheral sides of the rectangular display area 8, and a rotary drive (not depicted here) designed to rotate at least one of the two belt shafts 12. As can be identified best in the cross-sectional view of FIG. 2A, the belt 10 in this case forms a loop which is spanned between the two belt shafts 12 and wound around these. In this example, both belt shafts 12 have gear-like projections for carrying along the belt 10 during the rotation, with the belt 10 having projections with a complementary design on its inner face facing the shafts 12, which engage between the gear-like projections of the shafts with a form fit.

Only one powerful electric rotary drive is required for the conveyor belt 10. Moreover, the number of utilized LED bars 9 can be reduced to a minimum. Thus, overall, the energy balance of the arrangement can be optimized, and— if this is a battery electric vehicle—the range of the vehicle can be increased. To increase the running time and the robustness of the arrangement, the power and video signal transfer to the LED bars 9 is implemented contactlessly in this case, as explained below on the basis of FIG. 3.

FIG. 3 shows a cross-sectional view of a further example of the rectangular imaging display area 8 of the field-of-view display device 2 of FIG. 1. To avoid repetition, only differences or additional features not already described in relation to FIGS. 2a-2b are described below. Thus, a total of four or more light source bars 9 (not all are illustrated) are arranged on the conveyor belt 10 in FIG. 3 and can be distributed uniformly along the belt 10 in particular. Optionally, a plurality of lamellas 14 are additionally arranged on the outer side of the belt 10 in FIG. 3; for example, as illustrated, these can likewise be distributed uniformly along the direction of belt movement R. In this case, all lamellas 14 have the same spatial orientation among themselves in the display area 8, in order to output projection light L (cf. FIG. 1) to the windshield 4 in a predetermined emission direction and efficiently shield other viewing and radiation directions.

In this example, power is transferred inductively, and the transfer of video signals is contactless by NFC (near field communication). To this end, appropriately designed transmitter circuit boards 15 are provided in the interior of the conveyor belt 10, i.e. in an empty intermediate space 17 formed thereby, and associated receiver circuit boards 16 are provided on the outer side of the conveyor belt 10. The receiver circuit boards 16 are electrically connected to the light source bars 9 and equipped with capacitors, receiver coils, antennas, etc. designed for the aforementioned transfer. As a result of providing a plurality of transmitter and receiver circuit boards 15, 16, it is for example possible to increase the data rate of signal transfer, wherein the plurality of transmitter circuit boards 15 can be arranged at a sufficient distance from one another in the intermediate space 17 to this end, in order to prevent crosstalk. In FIG. 3, receiver circuit boards 16 are shown only on one side of the conveyor belt 10, which faces the user and serves as a display area 8, in order to simplify the illustration. In particular, the other conveyor belt side can have a similar design, i.e. have just as many light source bars 9 and receiver circuit boards 16.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

LIST OF REFERENCE SIGNS

1 Vehicle
2 Field-of-view display device
3 Eye of the user
4 Windshield
5 Instrument panel
6 Roof liner
7 Projection unit
8 Imaging display area
9 Light source bar
10 Moving belt, also referred to as conveyor belt
11 Cover pane
12 Belt shaft
14 Lamella
15 Transmitter circuit board
16 Receiver circuit board
17 Intermediate space
E Eye box of the user
L Projection light (beam)
R Direction of belt movement
V Virtual image 9                                                                                  10

What is claimed is:

1. A projection unit for a field-of-view display device that superimposes, via reflection, a virtual image on a reflection pane arranged in a field of view of a user, comprising:

at least one rectangular imaging display area which is arrangeable in or below a top side of an instrument panel of a vehicle, the rectangular imaging display area comprising a mechanically movable belt with at least one light source bar fastened thereon which extends across a direction of belt movement and carries strung-together light sources in an extent direction, the light sources being contactlessly controllable synchronously with the belt movement and independently of one another in order to create a desired display content in the display area;

at least one receiver circuit board fastened to the belt and electrically connected to the light sources; and at least one associated transmitter circuit board arranged stationarily in the projection unit in a manner mechanically decoupled from the belt and configured for contactless power and video signal transfer to the light sources via the at least one receiver circuit board.

2. The projection unit according to claim 1, further comprising:

two parallel belt shafts for each rectangular image display area, the belt shafts extending at two opposing peripheral sides of the display area; and a rotary drive configured to rotate at least one of the two belt shafts, wherein the belt forms a loop spanned between the two belt shafts and wound around the two belt shafts, wherein the at least one belt shaft rotatable by the rotary drive is configured to carry along the belt for creating the belt movement.

3. The projection unit according to claim 2, wherein the at least one receiver circuit board is fastened to the belt on an outer side; and/or the at least one transmitter circuit board is arranged in an intermediate space delimited by the belt loop, such that the transmitter circuit board has no mechanical contact with the belt or with the two belt shafts.

4. The projection unit according to claim 1, wherein at least a portion of the transmitter and receiver circuit boards is designed for inductively powering the light sources.

5. The projection unit according to claim 1, wherein at least a portion of the transmitter and receiver circuit boards is designed for contactless video signal transfer by near field communication.

6. The projection unit according to claim 1, wherein the transmitter and/or receiver circuit boards are distributed uniformly along the belt; and/or the receiver circuit boards are arranged on the belt next to the at least one light source bar or between light source bars.

7. The projection unit according to claim 1, wherein the belt comprises a plurality of lamellas arranged on the outer side and distributed uniformly along the direction of belt movement, the lamellas extend parallel to one another and to the light source bars and are designed to impress a predetermined emission direction on the projection light created by the light source bars and/or to shield the display area.

8. The projection unit according to claim 7, wherein the lamellas are spatially aligned substantially parallel to one another in the display area.

9. A field-of-view display device for use in a vehicle, comprising:

a projection unit according to claim 1; and the reflection pane or a specially provided combiner pane, arranged in a beam path of the projection light output by the projection unit, wherein the reflection pane is arranged in the field of view of the user and designed so as to reflect the projection light to an eye box predetermined for user eyes, whereby the display content is displayable to the user in the form of a virtual image beyond the reflection pane.

10. A vehicle with mutually perpendicular longitudinal, transverse and height directions of a Cartesian coordinate system fixed with respect to the vehicle, comprising:

a field-of-view display device according to claim 9; and a passenger compartment having a windshield with an instrument panel arranged therebelow that at least partly delimits the passenger compartment relative to an exterior, wherein the projection unit of the field-of-view display device is arranged in the passenger compartment and the reflection pane is designed as part of the vehicle pane or as a combiner pane specially arranged in the passenger compartment, and wherein the projection unit and its imaging display area are arranged in or below a top side of the instrument panel such that the windshield serves with at least a majority of its horizontal extent as the reflection pane of the field-of-view display device.

* * * * *